United States Patent
Fischer et al.

(10) Patent No.: US 8,892,861 B2
(45) Date of Patent: *Nov. 18, 2014

(54) METHOD AND APPARATUS FOR ESTABLISHING SAFE PROCESSOR OPERATING POINTS

(75) Inventors: Stephen Anthony Fischer, Gold River, CA (US); Varghese George, Folsom, CA (US); Sanjeev Jahagirdar, Folsom, CA (US); Stephen H. Gunther, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/365,096

(22) Filed: Feb. 2, 2012

(65) Prior Publication Data

US 2012/0137120 A1 May 31, 2012

Related U.S. Application Data

(63) Continuation of application No. 12/081,204, filed on Apr. 11, 2008, now Pat. No. 8,131,989, which is a continuation of application No. 10/953,771, filed on Sep. 30, 2004, now Pat. No. 7,370,189.

(51) Int. Cl.
G06F 1/24 (2006.01)
G06F 21/57 (2013.01)
G06F 21/70 (2013.01)

(52) U.S. Cl.
CPC .............. *G06F 21/57* (2013.01); *G06F 21/575* (2013.01); *G06F 21/70* (2013.01)
USPC ................ 713/2; 713/300; 713/600

(58) Field of Classification Search
CPC ............... G06F 21/575; G06F 21/70
USPC ............... 713/2, 300, 600
See application file for complete search history.

(56) References Cited

U.S. PATENT DOCUMENTS

| | | | |
|---|---|---|---|
| 5,963,068 A | 10/1999 | Hardesty et al. | |
| 6,385,735 B1 | 5/2002 | Wilson et al. | |
| 6,535,988 B1 | 3/2003 | Poisner | |
| 6,694,492 B1 | 2/2004 | Shakkarwar | |
| 6,754,837 B1 | 6/2004 | Helms | |
| 6,772,356 B1 * | 8/2004 | Qureshi et al. | 713/321 |
| 2003/0065915 A1 * | 4/2003 | Yu et al. | 713/1 |
| 2003/0065960 A1 | 4/2003 | Rusu et al. | |
| 2003/0084346 A1 | 5/2003 | Kozuch et al. | |
| 2003/0097602 A1 | 5/2003 | Bigbee et al. | |
| 2003/0126453 A1 | 7/2003 | Glew et al. | |
| 2003/0163723 A1 | 8/2003 | Kozuch et al. | |
| 2004/0199899 A1 | 10/2004 | Powers et al. | |

OTHER PUBLICATIONS

Non-Final Office Action for U.S. Appl. No. 13/842,974 Mailed Jun. 6, 2013, 8 Pages.

(Continued)

*Primary Examiner* — Albert Wang
(74) *Attorney, Agent, or Firm* — Lowenstein Sandler LLP

(57) ABSTRACT

A system and method is provided for establishing safe processor operating points. Some embodiments may include a tamper resistant storage element that stores information regarding one or more operating points of an adjustable processor operating parameter. Some embodiments may further include an element to determine what the current processor operating point is of the operating parameter, and an element to compare the current operating point of the operating parameter with the stored information.

21 Claims, 3 Drawing Sheets

(56) References Cited

OTHER PUBLICATIONS

5th Office Action for Chinese Patent Application No. 200510108553.x Mailed Apr. 3, 2009, 5 Pages.
4th Office Action for Chinese Patent Application No. 200510108553.x Mailed Apr. 4, 2008, 8 Pages.
2nd Office Action for Chinese Patent Application No. 200510108553.x Mailed Aug. 31, 2007, 9 Pages.
3rd Office Action for Chinese Patent Application No. 200510108553.x Mailed Dec. 21, 2007, 7 Pages.
Notice of Allowance for Chinese Patent Application No. 200510108553.x Mailed Sep. 18, 2009, 4 Pages.
Non-Final Office Action for U.S. Appl. No. 10/953,771 Mailed Nov. 13, 2006, 12 Pages.
Final Office Action for U.S. Appl. No. 10/953,771 Mailed Sep. 18, 2007, 10 Pages.
Notice of Allowance and Fees for U.S. Appl. No. 10/953,771 Mailed Dec. 28, 2007, 12 Pages.
Non-Final Office Action for U.S. Appl. No. 12/081,204 Mailed Feb. 18, 2011, 9 Pages.
Final Office Action for U.S. Appl. No. 12/081,204 Mailed Jul. 29, 2011, 7 Pages.
Notice of Allowance and Fees for U.S. Appl. No. 12/081,204 Mailed Nov. 14, 2011, 5 Pages.
Non-Final Office Action for U.S. Appl. No. 13/620,119 Mailed Mar. 19, 2013, 8 Pages.
Office action received for U.S. Appl. No. 13/620,119 mailed on Nov. 4, 2013, 9 pages.

\* cited by examiner

METHOD AND APPARATUS FOR ESTABLISHING SAFE PROCESSOR OPERATING POINTS

CROSS-REFERENCE TO RELATED APPLICATIONS

This application is a continuation of patent application Ser. No. 12/081,204 filed on Apr. 11, 2008 which is a continuation of patent application Ser. No. 10/953,771 filed on Sep. 30, 2004, which issued on May 6, 2008 as U.S. Pat. No. 7,370,189 the content of which is incorporated herein by reference.

TECHNICAL FIELD

Embodiments of the present invention generally relate to control of adjustable processor operating parameters and to computer processor security.

BACKGROUND OF THE INVENTION

Computer processors sometimes have adjustable operating parameters, such as the processor's operating voltage or the processor's clock frequency. In some laptop computer systems, for example, it may be desirable to reduce the processor's operating voltage and/or the processor's clock frequency in order to save power. The operating point (i.e., the level at which the processor operates) for such adjustable parameters may be changed during processor operation or at processor boot-up time, such as at a cold start or a reset. Adjustable operating parameters may be programmed to settings that are referenced by, for example, a set of operating points provided by the processor manufacturer. Such a processor operating parameters may be said to be adjustable or dynamic even though there may only be limited levels of adjustment, limited times when adjustments are made, and/or limits on the devices and mechanisms that cause the adjustment.

As noted above, one example of an adjustable operating parameter may be a processor's operating voltage. In some processors the processor's operating voltage is governed by an external voltage regulator, in which case the voltage regulator may accept a voltage select input that defines a desired voltage to be provided to the processor. The voltage regulator's voltage select input may be provided by the processor itself or a chipset and may be programmable by external software. Another example of an adjustable operating parameter may be processor clock frequency. Adjustable processor clock frequency may be supported, for example, by programmability of a divider between an external input source clock (e.g., an external bus clock) and an internal processor core clock. The processor core clock may represent some integer of a fractional multiple of the external clock, such as generated by a phase-lock-loop (PLL) or equivalent function. In this case, the internal processor clock operating frequency may be changed by reprogramming the value of the external-bus-to-core-clock divider.

Computer security involves techniques and mechanisms for protecting a computer or computer system from compromise through unauthorized access. Such security techniques may involve software and/or hardware security mechanisms and may include techniques directed to the security of the processor.

DETAILED DESCRIPTION

The devices and methods described below may be used to establish that a processor's operating parameter is at an established acceptable operating point, such as an operating point that falls within known limits for proper processor operation. Some embodiments of a system as described below may be used, for example, in a high security software environment to establish that a processor participating in a secure boot-up process has a known safe operating voltage and/or clock frequency, resulting in a higher confidence in the integrity of the boot-up process. A "secure boot" may occur dynamically during system operation, such as in the process of dynamically securing the system in order to execute a secure application, and may only require a boot of a secure kernal (i.e., without a reboot of the entire operating system). Confirmation of safe operating points may be part of an initial phase of the instruction(s) that perform the secure boot. Some embodiments may address intentional or accidental incorrect programming of a processor operating parameter outside of tested or supported operating points, which might otherwise lead to unreliable processor operation and a potentially exploitable security hole. In some embodiments, a processor may be considered to have been securely booted only if it is operating with its adjustable operating parameters at safe operating points, and a system may be considered to have securely booted only if all the processors in the system are operating with adjustable operating parameters at safe operating points. It will be appreciated that modifications and variations of the examples described herein are covered by the teachings provided below and are within the purview of the appended claims.

Figure 1:
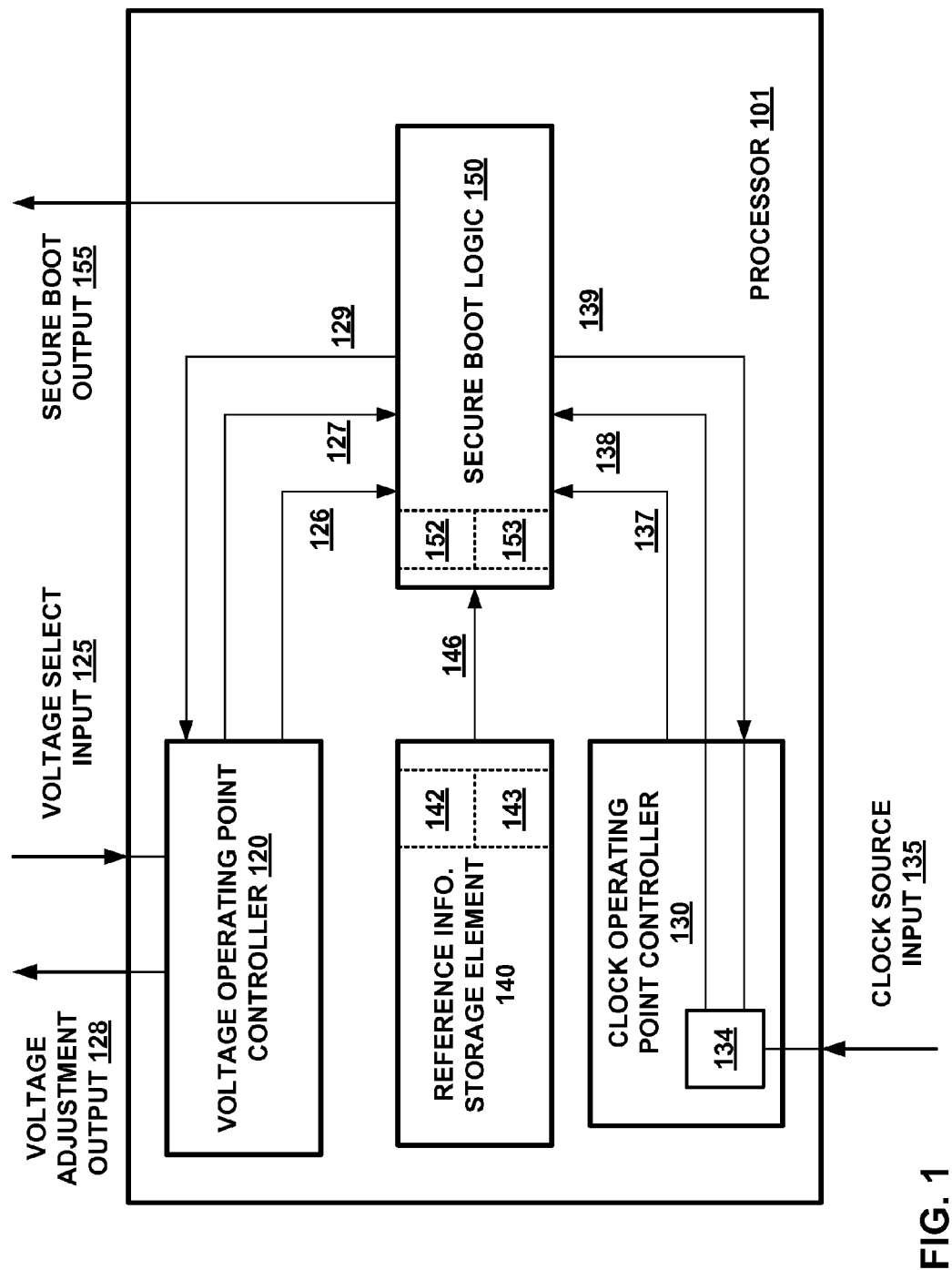
FIG. 1 is a simplified block diagram of a processor with elements for establishing safe processor operating points in accordance with an embodiment of the present invention.

FIG. 1 is a simplified block diagram of a processor with elements for establishing safe processor operating points in accordance with an embodiment of the present invention. FIG. 1 shows a processor 101 which has an adjustable operating voltage and core clock frequency. In other embodiments, the processor may only have one adjustable operating parameter, may have different adjustable operating parameters, or may have additional adjustable operating parameters (such as output buffer drive strength or a processor throttling point based on temperature, processor performance, power consumption, etc.). Processor 101 may be a system that is embodied on a chip or as multiple separate components.

As shown in FIG. 1, processor 101 has a voltage select input 125 and a clock source input 135 which at processor boot-up (also referred to herein as boot) may be used in determining the operating voltage and core clock frequency of processor 101. As discussed above, the voltage select input 125 may also be input to an external voltage regulator (not shown) which specifies the voltage that is input to processor 101. Processor 101 may determine what the current voltage is that is being driven to processor 101 by reading the voltage select input 125. In other embodiments, instead of a voltage select input 125, processor 101 may determine the current voltage by feedback from a voltage adjustment output, from a logic structure that feeds back, or some other arrangement. In some embodiments, clock source input 135 may accept input from an external input source clock, such as an external bus clock, and may be used to define the internal core clock frequency of processor 101.

As shown in FIG. 1, processor 101 contains a voltage operating point controller 120, a clock operating point controller 130, a reference information storage element 140, and secure boot logic 150. In the embodiment shown, voltage operating point controller 120 is coupled to voltage select input 125, is coupled to voltage adjustment output 128, and is coupled by lines 126, 127 and 129 to secure boot logic 150. Voltage operating point controller 120 may use voltage select input 125 to determine what the current voltage operating point is for processor 101. In some embodiments, voltage operating point controller 120 may adjust the current voltage operating point by sending a signal over voltage adjustment output 128 to a device that specifies the external voltage (such as an external voltage regulator). Thus, by sending a signal over voltage adjustment output 128, voltage operating point controller 120 may adjust the operating point for the operating voltage of processor 101. Of course, in other embodiments the operating voltage of processor 101 may be adjusted using other mechanisms, such as different internal control elements, different external control elements, fully internal elements, etc. In some embodiments, the voltage adjustment output and voltage select input may be implemented on the same pin, in a wired-or arrangement, or in arrangements other than shown in FIG. 1.

In the embodiment shown, clock operating point controller 130 is coupled to a clock input source 135 and is coupled by lines 137-139 to secure boot logic 150. In this embodiment, clock operating point controller 130 includes a programmable divider 134 which, as discussed above, may divide an external input source clock from clock source input 135 (e.g., an external bus clock) into an internal processor core clock, which thus may represent some integer of a fractional multiple of the external clock. In this case, the internal processor clock operating frequency may be changed by reprogramming the value of the external-bus-to-core-clock divider. In other embodiments, the clock frequency of processor 101 may be adjusted using other mechanisms, such as providing control to an external clock generator that provides the clock source.

In embodiments, reference information storage element 140 stores reference information regarding one or more acceptable operating points for one more adjustable processor operating parameters. Thus, a given processor may have internal storage for one-to-multiple reference points. For a given operating parameter, the reference information stored in reference information storage element 140 may define a single acceptable operating point or may specify a range of acceptable operating points for that parameter. As shown in FIG. 1, reference information storage element 140 contains a voltage reference storage element 142 and a clock reference storage element 143. Voltage reference storage element 142 may store information regarding an acceptable operating voltage, and clock reference storage element 143 may store information regarding an acceptable operating clock frequency. Voltage storage element 142 and clock reference storage element 143 may be, for example, silicon fuses, ROM, EEPROM, flash EPROM, or some other equivalent tamper resistant function. Although FIG. 1 shows separate voltage reference storage element 142 and clock reference storage element 143, settings for multiple operating parameters may also be stored together. Processor 101 may contain reference storage element 140 on the same chip or as a separate device that is external to the core processor chip, but may still be considered part of processor 101 as used herein.

In embodiments, reference information storage element 140 stores the reference information so that it is tamper resistant. A tamper resistant storage is one that stores information in such a way that the information cannot be easily modified by a person of skill in the art through unauthorized means, if it can be modified at all. For example, the reference information may constitute settings fixed in the processor hardware, firmware, microcode, etc., or settings fixed at manufacturing time. In some embodiments, the reference information storage element may be a separate device that is associated with the processor. In embodiments, such settings may not be changed without significant efforts, if at all, once installed in a customer system. Such settings may be established by the processor manufacturer based upon testing or some other quality assurance methods known to support reliable processor operation.

In connection with the boot function for processor 101, secure boot logic 150 may determine whether the current operating point of an operating parameter (such an operating voltage or operating clock frequency) is acceptable based on a comparison of the current operating point with the reference information. Secure boot logic 150 may be part of a processor's secure boot logic. In the embodiment of FIG. 1, secure boot logic 150 is coupled to reference information storage element 140 by line 146, which may provide secure boot logic 150 with reference information regarding one or more acceptable operating points (such as acceptable voltage and clock frequency) that is stored in reference information storage element 140. Secure boot logic 150 is also coupled to secure boot output 155, which as shown in FIG. 1 provides an output from processor 101, and contains comparator 152 and comparator 153. In some embodiments, comparator 152 may compare the operating voltage as indicated by voltage operating point controller 120 over line 127 with reference information regarding a secure voltage operating point that is stored in voltage storage element 142 to determine whether the current operating voltage is within an acceptable level. Similarly, comparator 153 may compare the operating clock frequency as indicated by clock frequency point controller 130 over line 138 with reference information regarding a secure voltage operating point that is stored in clock frequency storage element 143 to determine whether the clock frequency operating voltage is within an acceptable level.

In some embodiments, if secure boot logic 150 determines that the current operating point for an operating parameter is not acceptable, secure boot logic 150 may send a signal to the appropriate operating parameter controller (such as over line 129 or 139) to cause the controller to readjust the operating parameter to an acceptable operating point. In some embodiments, if secure boot logic 150 determines that the current operating point for an operating parameter is acceptable, secure boot logic 150 may send a signal over secure boot output 155 indicating that secure boot operating parameters have been confirmed. In embodiments, such an indication may be provided indirectly, such as by setting a register in a chipset or by a special bus cycle. In some embodiments, secure boot output 155 may indicate that all initialization has been completed to enable a secure boot, which may enable the secure boot to proceed. In some embodiments, secure boot logic 150 may comprise hardware, firmware, software, microcode, a state machine, or some combination of these components, or any other equivalent components.

Because in some embodiments a voltage change may involve incrementing or decrementing through a sequence of voltage control input stages in order to ramp to the newly selected operating target, voltage operating point controller 120 may provide an indication over voltage transition status line 126 to secure of whether the operating voltage is in a steady state or a transition state. Similarly, in embodiments where transition time must be provided to re-clock and become stable at the new core clock frequency, clock transition status line 137 may provide an indication from clock operating point controller 130 to secure boot logic 150 of whether a core clock frequency transition is in-progress. During such a transitional period, processor 101 may be forced into a temporary sleep, suspend, or stall state to avoid potential timing malfunctions that could result from an unstable processor core clock. In such embodiments, secure boot logic 150 may wait until the relevant operating parameter is at a steady state before determining whether that operating parameter is acceptable.

Figure 2:
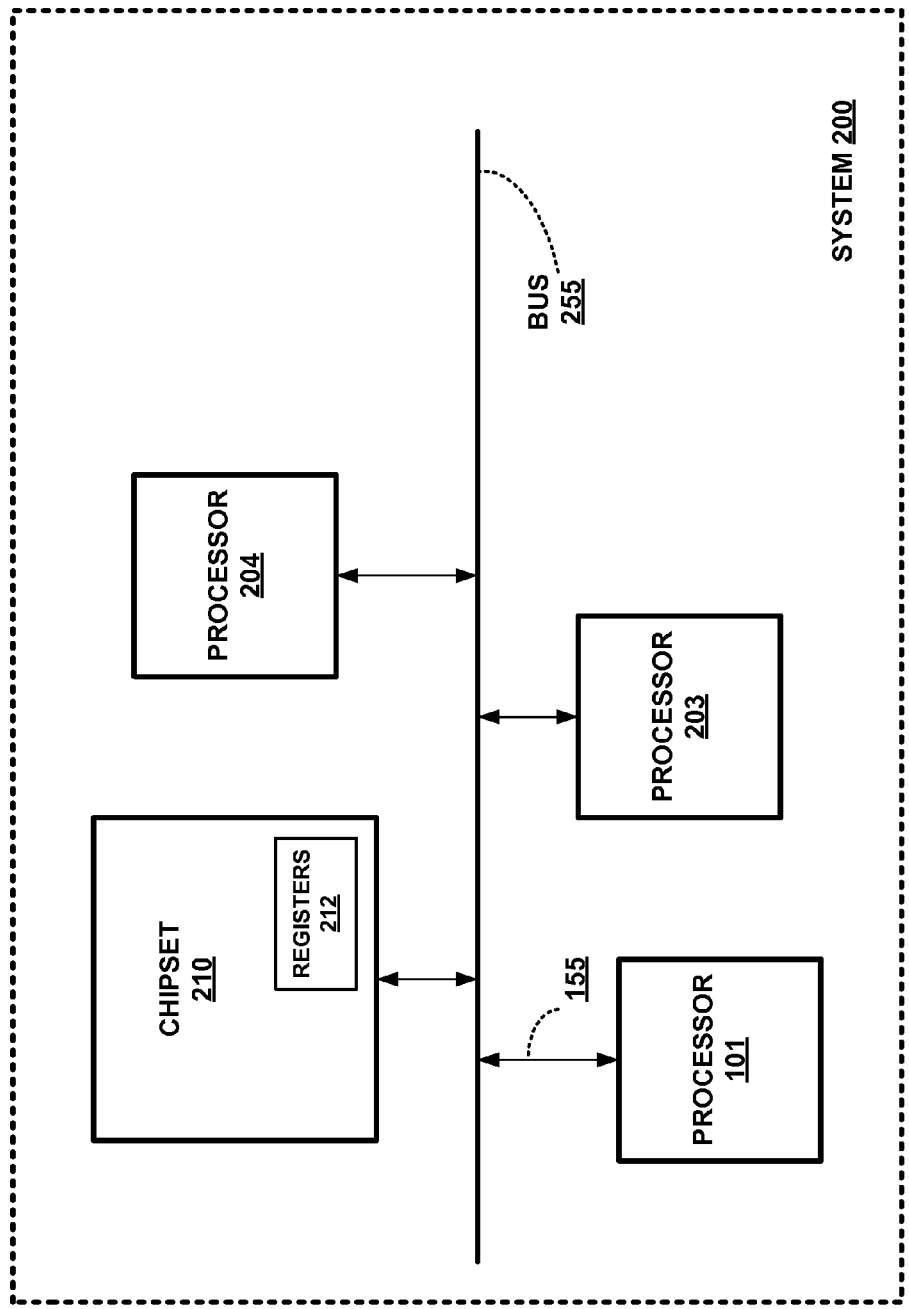
FIG. 2 is a simplified block diagram that illustrates a system with processors configured to establish the existence of safe processor operating points in accordance with an embodiment of the present invention.

FIG. 2 is a simplified block diagram that illustrates a system with processors configured to establish the existence of safe processor operating points in accordance with an embodiment of the present invention. FIG. 2 shows a system 200 that comprises processor 101, which is shown in more detail in FIG. 1, processors 203-204, and chipset 210, all of which are coupled to bus 255. The processors and chipset in system 200 may all be on the same computer platform, such as a motherboard, or may be on the same piece of silicon. Bus 255 may be a system bus. Processor 101 is coupled to bus 255 by secure boot output 155 of FIG. 1. In connection with a system boot, each of processors 101, 203 and 204 may provide an indication to chipset 210 that that processor has been found to have acceptable, and thus secure, operating points. In embodiments, the signaling may be accomplished by, for example, broadcast of a special bus message, inter-processor interrupt signaling, setting of status bits within the chipset, dedicated pin signaling between processors, etc. For example, processor 101 may send a secure boot indication to chipset 210 to indicate that processor 101 has been found to have acceptable operating points. As shown in FIG. 2, chipset 210 has registers 212 which may store the indication as to whether each processor has acceptable operating points.

In some embodiments, one of the processors (such as processor 204) may be the initiator or master of the boot and may indicate to the other processors in the system that they have all confirmed secure operating points. For example, once processor 204 has determined that it has secure operating points, it may check registers 212 to determine whether the other processors in the system also have secure operating points. If all processors have indicated that they are at secure operating points, processor 204 may concluded that it is safe to proceed with the secure boot function and may send such an indication (for example, by a broadcast over bus 255) to the other processors in system 200. In some embodiments, instead of chipset 210, another device (such as processor 204) may store the indication that each processor has reached a safe operating point.

Figure 3:
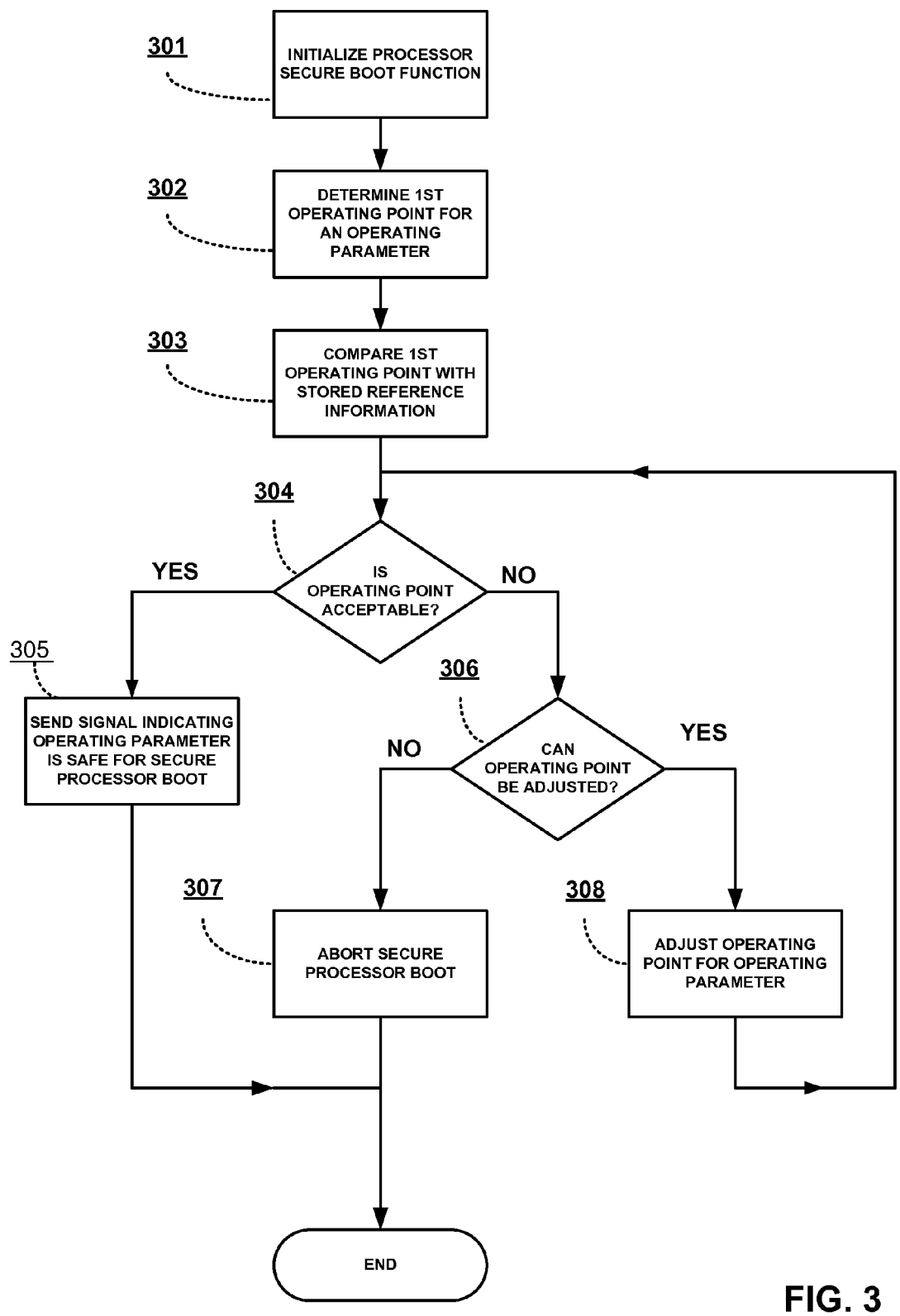
FIG. 3 is a simplified flow diagram for a method of establishing safe processor operating points for a secure boot in accordance with an embodiment of the present invention.

FIG. 3 is a simplified flow diagram for a method of establishing safe processor operating points for a secure boot in accordance with an embodiment of the present invention. The method of FIG. 3 is discussed with reference to the embodiments shown in FIGS. 1-2, but of course may be practiced with other apparatus. This method may be performed in connection with a boot function for the processor and may be part of a secure boot process. For example, this method may be invoked and or controlled by the boot function and may occur before, during, or after other operations relating to the processor boot function are taking place. This method may be performed by hardware, firmware, software, microcode, a state machine, or some combination of these components, or any other equivalent components.

According to the method shown in FIG. 3, a boot function is initiated (301). This boot function may be controlled, for example, by a processor Basic Input Output System (BIOS) or some other element, such as an operating system that may be in the process of dynamically securing the system in order to execute a secure application. In connection with this boot function, the first operating point of an operating parameter may be determined (302). The first operating point may be based on a signal received from outside the processor. For example, the processors operating voltage may be determined by voltage operating point controller 120 based on voltage select input 125 as discussed above. The first operating point may be compared against reference information (303). In some embodiments, the reference information may be stored in the processor in a tamper resistant or trusted storage element. For example, comparator 152 may compare the voltage operating point against the reference voltage stored in storage element 142. In some embodiments, the processor waits for the operating parameter to reach a stable state before it is compared with the reference information. If the first operating point is acceptable (304), then a signal may be sent to another processor or device (for example, over bus 255) indicating that the operating parameter is safe for processor boot (305), and which may enable the secure boot to proceed. In some embodiments, such as shown in FIG. 1, the processor may only make an indication that it is safe to proceed with the secure boot only if all of its adjustable parameters that are critical for reliable processor operation were determined to be at safe operating points.

If it was determined that the first operating point was not acceptable (304), then a determination may be made as to whether the processor is able to adjust the operating point (306). In some embodiments, although the chipset or other external device is able to adjust the operating point (such as the processor voltage), the processor may not be able to make such an adjustment through the secure boot logic, for example if the adjustment may only be made through the chipset. If the processor is not able to adjust the operating point, then the processor may abort from the secure processor boot (307). If the processor is able to adjust the operating parameter, then an adjustment may be made to the first operating point based on the stored reference information (308). For example, voltage operating point controller 120 may send a signal over voltage adjustment output 128 that modifies (increases or decreases) the voltage operating point for processor 101. The new operating point may be tested to determine if it is acceptable, as discussed above (304). In some embodiments, the secure boot logic may wait for the transition to the new state to occur (as shown, for example by clock transition status line 137) before determining if the new operating point is acceptable. In some embodiments, each adjustable operating parameter in the system (e.g., voltage and clock frequency) is considered using the method discussed above.

In some embodiments, the processor being booted is one processor in a system of physical or logical processors (which may or may not be on the same chip), and one of these processors may be the master processor or initiator for the purpose of a secure boot. In such embodiments, each logical processor in the system may each perform method such as discussed above. In embodiments, each logical processor may send an indication to a device, such as chipset 210, as to whether each processor's operating point was determined to be acceptable. If the master processor determines that the other processors have acceptable operating points, it may provide an indication to the other processors that all the processors in the system have acceptable operating points and are permitted to proceed with the secure boot.

According to embodiments as discussed above, forcing operation of processors participating in the secure boot function to known acceptable operating parameters closes a potential security hole that may otherwise lead to unreliable processor operation in connection with the boot function. It will be appreciated that modifications and variations of the embodiments discussed above are covered by the teachings provided and are within the purview of the appended claims.

What is claimed is:

1. A processor, comprising:
    first logic circuitry to cause said processor's boot up process to be a secure boot up process;
    second logic circuitry having an interface to communicate to a voltage regulator, said second logic circuitry having an input to accept first information as part of said secure boot up process, said first information indicative of a supply voltage applied to said processor during said secure boot up process;
    a storage element to store second information indicative of a safe supply voltage operating range of said processor; and
    comparison circuitry to accept said first information and said second information, said comparison circuitry to compare said first information with said second information to determine whether said supply voltage resides within said safe supply voltage operating range,
    wherein in response to a determination that said supply voltage resides within said safe supply voltage operating range, said processor is to broadcast to a chipset a signal indicating that it is safe to initiate said processor's boot up process.

2. The processor of claim 1, wherein said storage element is located within the processor.

3. The processor of claim 1, wherein said storage element is a silicon fuse.

4. The processor of claim 1, wherein said storage element is tamper resistant.

5. The processor of claim 1, wherein said comparison circuitry further provides a signal to said voltage regulator indicative of a new supply voltage.

6. The processor of claim 5, wherein said new supply voltage is provided when said comparison circuitry indicates that said supply voltage is outside said safe supply voltage operating range.

7. The processor of claim 1, further comprising:
    abort logic circuitry to abort the boot if said supply voltage is outside said safe supply voltage operating range.

8. The processor of claim 1, further comprising:
    broadcast circuitry to broadcast a special bus cycle to indicate that said supply voltage is within said safe supply voltage operating range.

9. The processor of claim 1, further comprising:
    third logic circuitry having an interface to communicate to a clock regulator, said third logic circuitry having an input that accepts third information, said third information indicative of a source clock frequency;
    a second storage element to store fourth information indicative of an acceptable range for an operating clock frequency; and
    second comparison circuitry to accept said third information and said fourth information and to ensure that said source clock frequency is within said acceptable range for said operating clock frequency during said boot up process.

10. The processor of claim 9, further comprising:
    divider circuitry to divide said source clock frequency such that said divided clock frequency is within said acceptable range for said operating clock frequency.

11. The processor of claim 1, wherein in response to receiving from the chipset an indication that it is safe to initiate boot up processes of all processors associated with the chipset, said first logic circuitry is to cause said processor's boot up process to be performed.

12. The processor of claim 1, wherein the signal indicating that it is safe to initiate said processor's boot up process is a special bus signal.

13. The Processor of claim 1, wherein the signal indicating that it is safe to initiate said processor's boot up process is an inter-processor interrupt signal.

14. A method, comprising:
    initiating a secure boot up process for a processor;
    as part of said secure boot up process, receiving a first information indicative of a supply voltage for said processor from a voltage regulator;
    comparing said supply voltage to a stored safe supply voltage operating range for said processor to determine whether said supply voltage resides within said safe supply voltage operating range; and
    in response to a determination that said supply voltage resides within said safe supply voltage operating range, broadcasting to a chipset a signal indicating that it is safe to initiate said processor's boot up process.

15. The method of claim 14, wherein said safe supply voltage is stored in a storage element is located within the processor.

16. The method of claim 15, wherein said safe supply voltage is stored in a tamper resistant storage element.

17. The method of claim 14, further comprising:
    providing a new supply voltage to said voltage regulator when said supply voltage is outside said safe supply voltage operating range.

18. The method of claim 14, further comprising:
    aborting said boot process if said supply voltage is outside said safe supply voltage operating range.

19. The method of claim 14, further comprising:
    broadcasting an indication that said supply voltage is within said safe supply voltage operating range.

20. The method of claim 14, further comprising:
    receiving a second information indicative of a source clock frequency for said processor;
    comparing said source clock frequency to a stored acceptable range for an operating clock frequency for said processor; and
    ensuring that said source clock frequency is within said acceptable range for said operating clock frequency during said boot up process.

21. The method of claim 20, further comprising:
    dividing said source clock frequency such that said divided clock frequency is within said acceptable range for said operating clock frequency.

* * * * *